(12) United States Patent
Spuller et al.

(10) Patent No.: US 7,306,453 B2
(45) Date of Patent: Dec. 11, 2007

(54) INJECTION MOLDING TOOL

(75) Inventors: Swen Spuller, Forchheim (DE); Vincenc Selak, Rhinau (FR)

(73) Assignee: Otto Männer Innovations, GmbH, Bahlingen (DE)

( * ) Notice: Subject to any disclaimer, the term of this patent is extended or adjusted under 35 U.S.C. 154(b) by 228 days.

(21) Appl. No.: 11/062,155

(22) Filed: Feb. 22, 2005

(65) Prior Publication Data

US 2005/0191382 A1    Sep. 1, 2005

(30) Foreign Application Priority Data

Feb. 28, 2004 (DE) .................. 102 004 009 806

(51) Int. Cl.
*B29C 45/20* (2006.01)
(52) U.S. Cl. ...................................... 425/549
(58) Field of Classification Search ................. 425/549
See application file for complete search history.

(56) References Cited

U.S. PATENT DOCUMENTS 6,331,106 B1 * 12/2001 Helldin ....................... 425/549
6,533,571 B2 * 3/2003 Fikani ........................ 425/549

* cited by examiner

*Primary Examiner*—Tim Heitbrink
(74) *Attorney, Agent, or Firm*—Klaus J. Bach

(57) ABSTRACT

In an injection molding nozzle for an injection molding tool having an opening for receiving the injection molding nozzle, at least a first mounting element of low heat conductivity is firmly connected to the injection molding nozzle so as to permit accurate machining of the mounting element together with the nozzle such that the nozzle can be installed in the opening of the molding tool by an accurate press fit without directly contacting the base body of the molding tool.

7 Claims, 1 Drawing Sheet

INJECTION MOLDING TOOL

BACKGROUND OF THE INVENTION

The invention resides in an injection molding nozzle which is installed in a base member of an injection molding tool by means of a support element which has a lower heat conductivity than the base member. The invention also relates to an injection molding tool which includes such an injection molding nozzle.

Such injection molding nozzles and injection molding tools are well-known in the art.

In order to accommodate high quality requirements, an injection molding nozzle must be installed into the base body of an injection molding tool with high accuracy. Particularly an injection nozzle with a needle valve must be installed in the base body of the injection molding tool with high accuracy, since it is important for good operation and long operating periods of an injection molding tool, that the valve needle is inserted into the discharge opening of the injection molding nozzle in a perfectly centered way. Injection molding nozzles are therefore always installed into the base body of the injection molding tool with a press fit.

With such a press-fit, a transition area with good heat conductivity between the injection molding nozzle and the base body is formed. This is disadvantageous particularly in connection with hot channel injection molding tools, since, in order to be able to manufacture an injection molding part of high quality the injection molding material is to be maintained within a hot channel nozzle at a relatively constant temperature. Particularly in connection with high-tech applications, there is only a small processing temperature window for the molding material being processed.

In order to avoid for example temperature changes of the injection molding material in the injection nozzle, often special heat sources are arranged at or near the injection molding nozzle. This however is very expensive.

If, for example, between the injection molding nozzle and the base body of the injection molding tool, a ring or a washer of a ceramic material is arranged, the heat transfer resistance between the injection molding nozzle and the base body is increased whereby the heat conduction out of the injection nozzle is decreased. However, the placement of such a ring or washer between the injection molding nozzle and the base body reduces the precision of the arrangement of the injection molding tool. With such a ceramic ring or, respectively, ceramic washer the injection molding nozzle can no longer be accurately positioned in the base body of the injection molding tool by means of a press fit.

It is the object of the present invention to provide an injection molding nozzle and an injection molding tool of the type referred to above wherein the heat transfer resistance between the injection nozzle and the base body of the injection molding tool is high and the injection molding nozzle is installed in the base body with a close fit.

SUMMARY OF THE INVENTION

In an injection molding nozzle for an injection molding tool having an opening for receiving the injection molding nozzle, at least a first mounting element of low heat conductivity is firmly connected to the injection molding nozzle so as to permit accurate machining of the mounting element together with the nozzle such that the nozzle can be installed in the opening of the molding tool by an accurate press fit without directly contacting the base body of the molding tool.

Since the first element of low heat conductivity is firmly connected to the injection molding nozzle, the first element or, respectively, the injection nozzle can be machined after the application of the first mounting element to the injection molding nozzle. With the firm connection of the first mounting element with the injection molding nozzle, the injection molding nozzle or, respectively, the first mounting element connected thereto can be machined or ground with extremely high accuracy. As a result, the injection molding nozzle or respectively, the first mounting element can be machined such that the injection molding nozzle can be installed in the base body of the injection molding tool with high accuracy.

Although the injection molding nozzle can be installed in this base body by means of one element with low heat conductivity, it is still very advantageous if a second element with low heat conductivity is present and the two elements are so arranged that the first element is disposed in the area of the inlet opening of the admission channel and the second element is arranged in the area of the discharge opening of the injection molding nozzle. It is particularly advantageous if the first element and/or the second element consist of a ceramic material as it is the case in a particular embodiment of the invention. Ceramic materials have on one hand a low heat conductivity and, on the other hand, can be easily and accurately machined.

An embodiment of the invention, wherein the first and/or the second element is connected to the injection molding nozzle in a force locking manner, for example, by cementing is very advantageous. In this way, the first, and if applicable, the second mounting elements are firmly connected to the injection molding nozzle which is very advantageous for machining the respective elements.

Instead of cementing the first and the second element to the injection molding tools, the first and/or the second element may also be soldered to the injection molding nozzle if, under the circumstances, this would be advantageous. Also by soldering, the elements are sufficiently firmly connected to the injection molding nozzle that they can be accurately machined.

Although a force-locking connection is preferred, the first element and also the second element may be connected to the injection molding nozzle by a form locking structure. For example, the first and also the second element may be connected to the injection molding nozzle by means of a thread or a dovetail joint.

The first mounting element and/or the second mounting element do not need to fully surround the injection molding nozzle. Instead of being rings, they may be in the form of segments which are connected to the injection molding nozzle by dovetail joints. Still, it is advantageous if at least the second element fully surrounds the injection molding nozzle as it is provided in one embodiment of the invention. In this way, a seal can be formed to prevent leakages during the injection molding procedure. With the precise machining of the second mounting element not only can the injection molding nozzle be arranged on the base body of the injection molding body in a highly precise manner but, furthermore, a well sealed transition is formed between the injection molding nozzle and the base body.

With the injection molding tool according to the invention, injection molding nozzles can be installed into the injection molding tool with high precision, such that a high thermal resistance area is generated between the injection molding nozzle and the injection molding tool. Since the injection molding nozzles according to the invention are physically not different from injection molding nozzles without mounting elements of low heat conductivity, the injection molding nozzles according to the invention can be treated just like conventional injection molding nozzles. Furthermore, it is easily possible to replace conventional injection molding nozzles by injection molding nozzles according to the invention. As a result, conventional injection molding tools can easily be modernized by replacement of their conventional injection molding nozzles with injection molding nozzles according to the invention.

The invention will become more readily apparent from the following description thereof on the basis of the accompanying drawings.

DESCRIPTION OF A PREFERRED EMBODIMENT OF THE INVENTION

Figure 1:
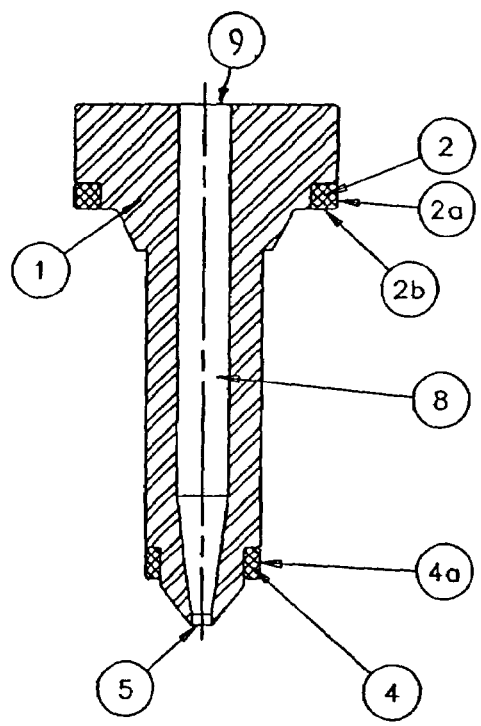
FIG. 1 is a cross-sectional view of an injection molding nozzle according to the invention.

As shown in FIG. 1, an injection molding nozzle 1 includes a discharge opening 5 for the discharge of molding material. The discharge opening 5 forms the end of a supply channel 8 provided with an inlet opening 9 at the end of the injection molding nozzle opposite the discharge opening 5.

At the end opposite the discharge opening 5, the injection molding nozzle diameter is increased whereby a head similar to a bolt head is formed with a shoulder including a recessed area in which a first mounting element of low heat conductivity in the form of a first ceramic ring 2 is arranged. The ceramic ring 2 is firmly attached to the injection molding nozzle 1 by cementing.

At its end including the discharge opening 5, the injection molding nozzle 1 has a conical shape. The injection molding nozzle 1 further is provided at this end with a circumferential shoulder which forms a recess in which a ceramic ring 4 is arranged forming a second ceramic ring 4. The second ceramic ring 4 is firmly connected to the injection molding nozzle 1 by cementing. The ceramic rings 2 and 4 have a substantially lower heat conductivity than the nozzle body.

Since the first ceramic ring 2 and the second ceramic ring 4 are both firmly attached to the injection molding nozzle 1, the ceramic rings 2 and 4 can by ground accurately in position on the injection molding nozzle 1. With the grinding, an accurately dimensioned surface area 4a is formed on the second ceramic ring 4 which forms, with the respective area of a base body 3 of the injection molding tool, a press fit and, on the ceramic ring 2, a side surface area 2a and a lower seal surface area 2b, which are also accurately dimensioned and form with the corresponding area of the molding tool base body 3 an accurate, form-fitting connection.

Figure 2:
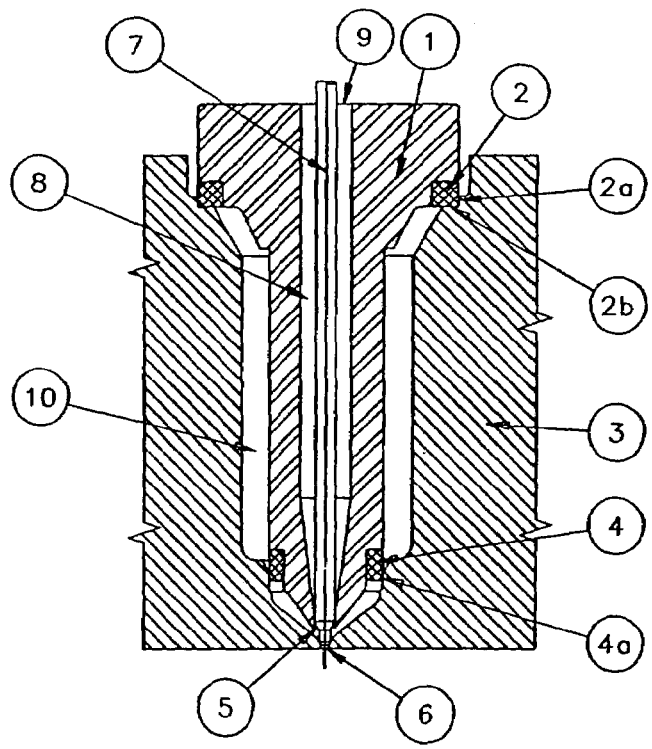
FIG. 2 shows a section of an injection molding tool with an injection molding nozzle installed in a base body of the injection molding tool.

As shown in FIG. 2, an injection molding nozzle 1 is arranged in an opening 10 of a base body 3 of an injection molding tool and is supported in the base body by way of the ceramic rings 2, 4, which have a relatively low heat conductivity, that is a lower heat conductivity than the base body 3. The injection molding nozzle 1 installed in the opening 10 corresponds essentially to the injection molding nozzle 1 as described with reference to FIG. 1. Identical elements are therefore designated by the same reference numerals.

The injection molding nozzle 1 is fitted to the base body 3 by a press fit which is formed with the respective areas of the base body 3 by the accurately machined surface areas 4a of the second ceramic ring 4 and the accurately machined surface areas 2a, 2b of the first ceramic ring 2.

In contrast to the injection molding nozzle 1 shown in FIG. 1, the injection nozzle 1 shown in FIG. 2 includes in the supply channel 8 an axially movable valve needle 7 by way of which the discharge opening 5 can be closed. Since the injection molding nozzle 1 is mounted to the base body 3 of the injection molding tool by a press fit the valve needle 7 is arranged concentric with respect to the discharge opening 5 with high accuracy. This is advantageous with regard to the friction between the valve needle 7 and the wall of the supply channel 8 whereby the reliability and life of the injection molding tool are increased. At the same time, the discharge opening 5 is concentric with an opening 6 formed in the base body 3 of the injection molding tool.

With the high accuracy of the surface area of the second ceramic ring 4, there is furthermore no gap between the second ceramic ring 4 and the base body 3 so that the open area 10 is sealed during the injection molding procedure.

What is claimed is:

1. An injection molding nozzle (1) for an injection molding tool having a base body (3) with an opening (10) receiving the injection molding nozzle (1), said injection molding nozzle (1) having a molding material supply channel (8) with a discharge opening (5) for discharging molding material at one end thereof and an inlet opening (9) at the opposite end, said injection molding nozzle (1) including means (2) for firmly and accurately installing the injection molding nozzle (1) into the opening (10) in the base body (3), comprising at least a first mounting element (2) of a heat conductivity lower than that of the base body (3), said first mounting element (2) being firmly connected to the injection molding nozzle (1) so as to permit machining of the first mounting element (2) together with the injection molding nozzle (1) for accurately dimensioning the first mounting element (2) together with the injection molding nozzle (1).

2. An injection molding nozzle according to claim 1, wherein the injection molding nozzle (1) includes a second mounting element (4) of low heat conductivity, said first mounting element (2) being arranged in the area of the inlet opening (9) and the second mounting element (4) being arranged in the area of the outlet opening (5).

3. An injection molding nozzle according to claim 2, wherein the mounting elements (2, 4) consist of a ceramic material.

4. An injection molding nozzle according to claim 2, wherein the mounting elements (2, 4) are cemented to the injection molding nozzle (1).

5. An injection molding nozzle according to claim 2, wherein the mounting elements (2, 4) are soldered to the injection molding nozzle (1).

6. An injection molding nozzle according to claim 2, wherein at least the second mounting element (4) completely surrounds the injection molding nozzle (1).

7. An injection molding tool including a base body (3) with an opening (10) receiving an injection molding nozzle (1), said injection molding nozzle (1) having a molding material supply channel (8) with an inlet opening (9) at one end thereof and, at the opposite end, a discharge opening (5) for discharging molding material, said injection molding nozzle (1) including means (2) for firmly and accurately installing the injection molding nozzle (1) into the opening (10) in the base body (3), comprising a first mounting element (2) in the area of the inlet opening (9) and a second mounting element (4) in the area of the discharge opening (5) of the molding nozzle (5), said first and second mounting elements (2, 4) having a lower heat conductivity than said base body (3) and being firmly connected to the injection molding nozzle (1) so as to permit machining of the first and second mounting elements (2, 4) together with the injection molding nozzle (1) for accurately dimensioning the mounting elements (2, 4) together with the injection molding nozzle (1), said injection molding nozzle being firmly installed in said base body opening (10) by a press fit via the first and second mounting elements (2, 4) such that the injection molding nozzle is not in direct heat transfer contact with the base body (3).

* * * * *